(12) United States Patent
Bachl et al.

(10) Patent No.: US 8,942,222 B2
(45) Date of Patent: Jan. 27, 2015

(54) FREQUENCY SYNCHRONIZATION IN WIRELESS COMMUNICATION SYSTEMS

(75) Inventors: Rainer Bachl, Nuremberg Bavaria (DE); Jung A. Lee, Pittstown, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 1382 days.

(21) Appl. No.: 11/668,311

(22) Filed: Jan. 29, 2007

(65) Prior Publication Data

US 2008/0182582 A1 Jul. 31, 2008

(51) Int. Cl.
*H04J 3/06* (2006.01)
*H04B 7/208* (2006.01)
*H04B 5/00* (2006.01)
*H04L 27/26* (2006.01)
*H04L 27/00* (2006.01)

(52) U.S. Cl.
CPC ........ *H04L 27/2657* (2013.01); *H04L 27/2675* (2013.01); *H04L 2027/0053* (2013.01); *H04L 2027/0065* (2013.01); *H04L 2027/0087* (2013.01)
USPC ............................ 370/350; 370/344; 455/502

(58) Field of Classification Search
CPC .............. H04W 56/00; H04W 56/001; H04W 56/0015; H04W 56/0035; H04W 56/004; H04W 56/005; H04W 56/0055; H04W 56/002
USPC ........... 370/344, 503, 342, 350; 455/446, 502
See application file for complete search history.

(56) References Cited

U.S. PATENT DOCUMENTS

| | | | | |
|---|---|---|---|---|
| 5,604,768 | A * | 2/1997 | Fulton ............................ | 375/220 |
| 5,991,344 | A * | 11/1999 | Fujii et al. ..................... | 375/344 |
| 6,985,432 | B1 * | 1/2006 | Hadad ............................ | 370/203 |
| 6,985,705 | B2 * | 1/2006 | Shohara ..................... | 455/164.1 |
| 7,170,943 | B1 * | 1/2007 | Van Heeswyk et al. ...... | 375/259 |
| 2002/0101840 | A1 * | 8/2002 | Davidsson et al. ........... | 370/330 |
| 2004/0076239 | A1 * | 4/2004 | Yu et al. ........................ | 375/260 |
| 2004/0076246 | A1 * | 4/2004 | Vanderperren et al. ........ | 375/343 |
| 2005/0025042 | A1 * | 2/2005 | Hadad ............................ | 370/208 |
| 2005/0147188 | A1 * | 7/2005 | Liu ................................ | 375/326 |
| 2006/0239368 | A1 * | 10/2006 | Hwang et al. ................. | 375/260 |
| 2009/0129495 | A1 * | 5/2009 | Jin et al. ........................ | 375/260 |
| 2009/0141700 | A1 * | 6/2009 | Baldemair et al. ............ | 370/350 |

* cited by examiner

*Primary Examiner* — Marisol Figueroa
(74) *Attorney, Agent, or Firm* — Davidson Sheehan LLP (57) ABSTRACT

The present invention provides a method of wireless communication over a communication link including at least one carrier that comprises a plurality of sub-carriers. The method includes modifying at least one frequency of at least one uplink sub-carrier in response to a signal indicating a modification of the frequency.

16 Claims, 8 Drawing Sheets

FREQUENCY SYNCHRONIZATION IN WIRELESS COMMUNICATION SYSTEMS

BACKGROUND OF THE INVENTION

1. Field of the Invention

This invention relates generally to communication systems, and, more particularly, to wireless communication systems.

2. Description of the Related Art

Wireless communication systems typically include one or more base stations or access points for providing wireless connectivity to mobile units in a geographic area associated with each base station or access point. Mobile units and base stations communicate by transmitting modulated radiofrequency signals over a wireless communication link, or air interface. The air interface includes downlink (or forward link) channels for transmitting information from the base station to the mobile unit and uplink (or reverse link) channels for transmitting information from the mobile unit to the base station. The uplink and downlink channels are typically divided into data channels, random access channels, broadcast channels, paging channels, control channels, and the like.

The channels in a wireless communication system are defined by one or more transmission protocols. For example, in wireless communication systems that operate according to the Frequency Division Multiple Access (FDMA) protocol, the transmission bandwidth allocated to the air interface is divided into a number of frequencies and these frequencies are allocated to the various channels. For another example, Code Division Multiple Access (CDMA) protocols implement coding sequences that may be used to modulate transmitted information so that multiple users may transmit on the same frequency or set of frequencies. Other transmission protocols include Orthogonal Frequency Division Multiple Access (OFDMA) and Single Carrier-FDMA (SC-FDMA). In an OFDMA system, the available bandwidth may be divided into a plurality of orthogonal subcarrier frequencies (commonly referred to as subcarriers), which may be allocated to one or more subchannels so that multiple users may transmit data concurrently using separate groups of subchannels. In SC-FDMA, the available bandwidth is also divided into a plurality of orthogonal subcarriers similar to OFDMA, but discrete Fourier transform (DFT) pre-coding is used to provide low Peak-to-Average-Power Ratio (PAPR) compared with OFDMA transmission.

Conventional wireless communication systems typically implement techniques for ensuring timing synchronization between the base stations and the mobile units. However, these wireless communication systems typically do not implement techniques for frequency synchronization between the base stations and the mobile units. Consequently, a frequency offset may be formed between the expected frequency of each sub-carrier and the actual frequency that is transmitted and/or received by a base station or mobile unit. For example, wireless communication protocols such as the Evolved UMTS Terrestrial Radio Access (E-UTRA) system require network operation at user equipment (UE) speeds of up to 350 kmph or even at higher speed of 500 kmph. The maximum frequency offset $f_{offset}$ seen at an eNode B receiver may be expressed as:

$$f_{offset} = \Delta f_{BS} + \Delta f_{UE} + 2 \times f_{Doppler\_max} \quad \text{(Eq. 1)}$$

where $\Delta f_{BS}$, $\Delta f_{UE}$, and $f_{Doppler\_max}$ denote the base station frequency drift, the UE frequency error, and the maximum Doppler frequency, respectively. In the UMTS W-CDMA system, the frequency error at the base station and the UE is required to be less that 0.05 ppm and 0.1 ppm of the carrier frequency, respectively. For a carrier frequency of 2.1 GHz, the maximum frequency offset is therefore 781 Hz for a UE moving at the velocity 120 kmph, and can be as large as 2260 Hz, when the velocity is 500 kmph.

Figure 1:
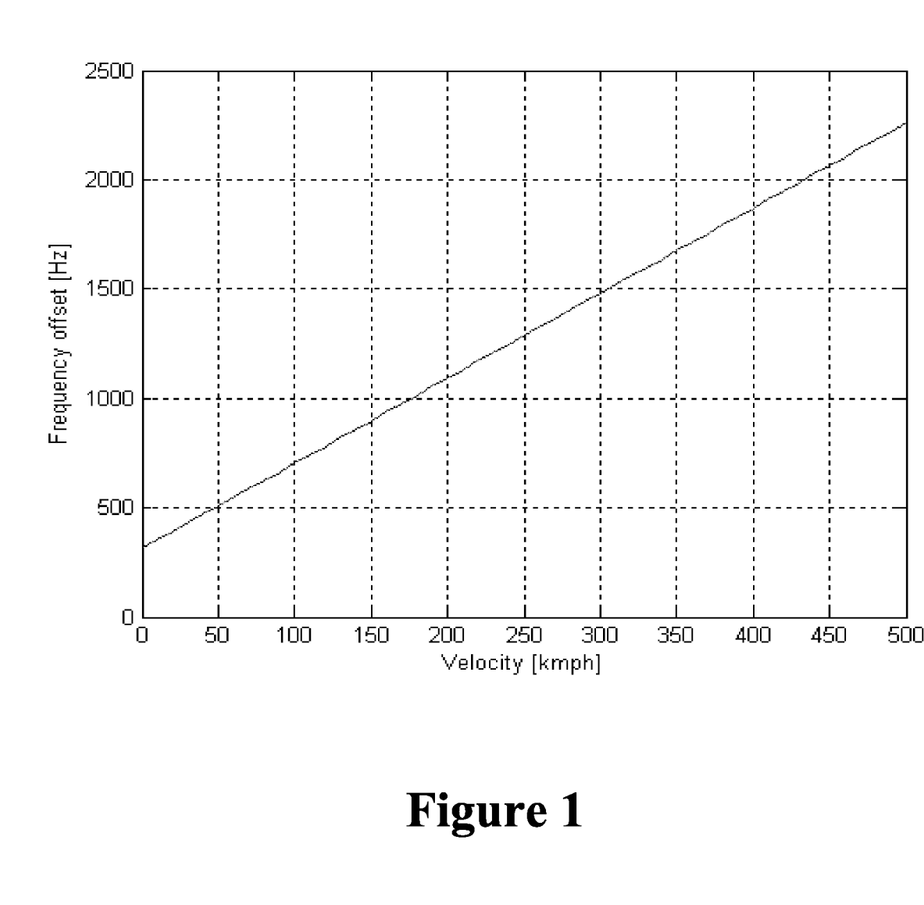
FIG. 1 shows the frequency offset of one mobile unit as a function of the velocity of the mobile unit.

FIG. 1 shows the frequency offset of one mobile unit as a function of the velocity of the mobile unit. The vertical axis indicates the frequency offset in Hertz and the horizontal axis indicates the velocity in kilometers per hour. The frequency offset at 0 kph corresponds to the base station frequency drift and the user equipment frequency error. The frequency offset increases approximately linearly with increasing velocity as the Doppler shift of the moving mobile unit increases. In FIG. 1, the frequency offset increases from approximately 350 Hertz to approximately 2260 Hertz.

Figure 2:
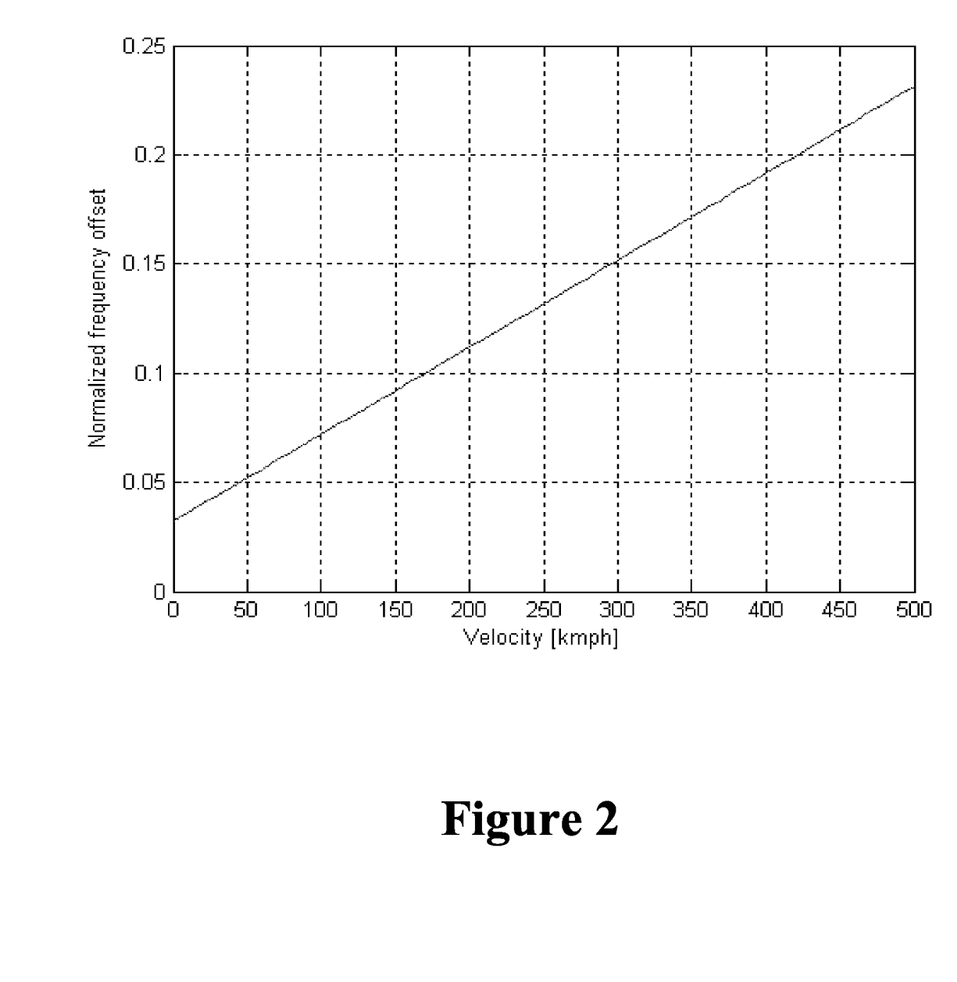
FIG. 2 shows the normalized frequency offset of one mobile unit as a function of the velocity of the mobile unit.

FIG. 2 shows the normalized frequency offset of one mobile unit as a function of the velocity of the mobile unit. In the FIG. 2, the frequency offset is normalized to the sub carrier spacing. For example, the normalized frequency offset (denoted as $\epsilon$) is obtained as $$\varepsilon = \frac{f_{offset}}{\Delta f_{sub-carrier}} \quad \text{(Eq. 2)}$$

The vertical axis indicates the normalized frequency offset as a percentage of the subcarrier spacing and the horizontal axis indicates the velocity in kilometers per hour. The normalized frequency offset at 0 kmph corresponds to the base station frequency drift and the user equipment frequency error. In FIG. 2, the normalized frequency offset at 0 kmph is approximately 0.03 of the subcarrier spacing. However, the Doppler shift causes the normalized frequency offset to increase to approximately 23% of the subcarrier spacing at velocities of 500 kph. Furthermore, when there are two UEs travelling in opposite directions, the amount of residual frequency offset between the two UEs can be twice that of the frequency offset between a single UE and the eNodeB.

Figure 3:
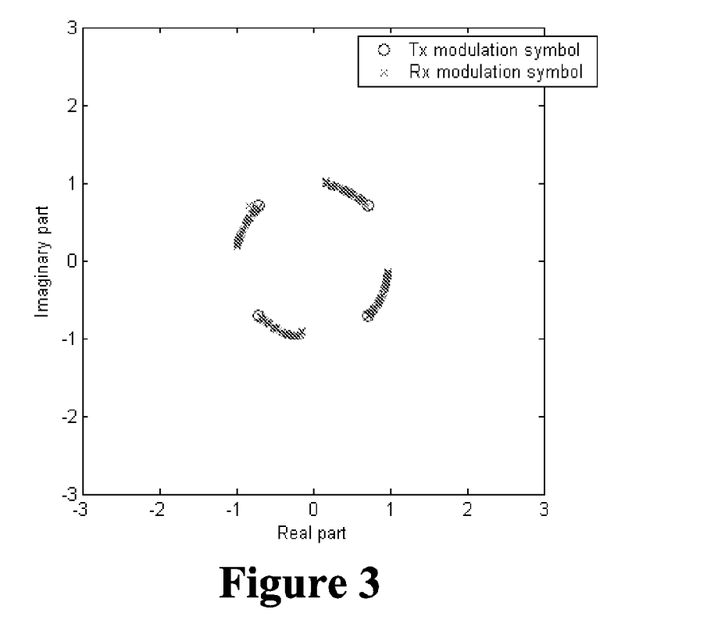
FIGS. 3 and 4 show the impact of frequency offset on the modulation symbol in a SC-FDMA system.
Figure 4:
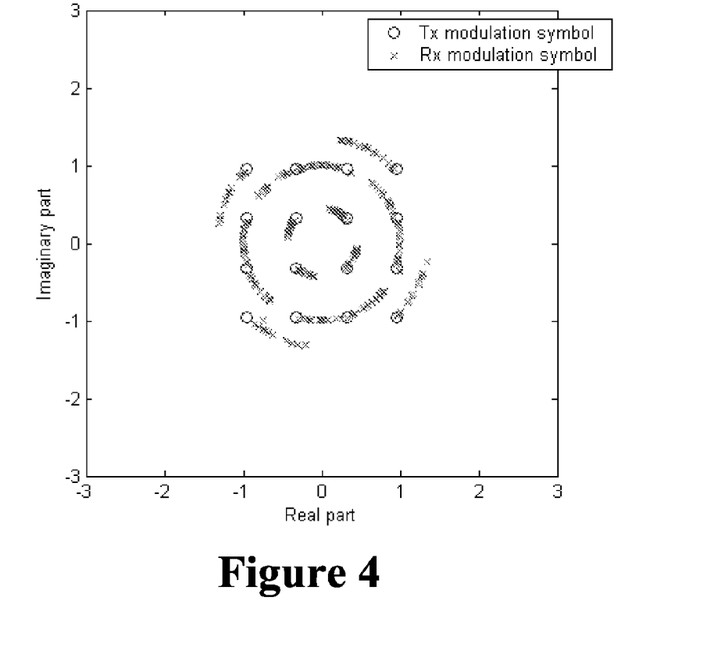

FIGS. 3 and 4 show the impact of frequency offset on the modulation symbol in a SC-FDMA system. The vertical axes in these figures indicate the imaginary part of the modulation symbol and the horizontal axes indicate the real part of the modulation symbol. FIG. 3 shows a received signal constellation in the presence of frequency offset for QPSK modulation and a normalized frequency offset of 0.1. FIG. 4 shows a received signal constellation in the presence of frequency offset for 16-QAM modulation and a normalized frequency offset of 0.1. As in any single-carrier system, frequency offset introduces rotation of the signal constellation. The amount of rotation depends on the sampling rate and the symbol duration. Conventional wireless communication systems implement a frequency offset estimation and compensation algorithm on the receiver-side. The frequency offset estimation and compensation algorithms can rotate the signal approximately back to the original constellation. However, in a multi-user FDM system, frequency offsets also exacerbate inter-carrier interference (ICI) and these effects cannot be corrected by simply applying a frequency offset estimation and compensation algorithm, at least in part because of the difficulty in separating contributions from symbols transmitted using the different carriers with different frequency offset. In some cases, the ICI can be significant and limit the performance of multi-user SC-FDMA system. The signal degradation caused by ICI may be particularly acute when users with different received SNR requirements are scheduled in adjacent subcarriers.

Figure 5:
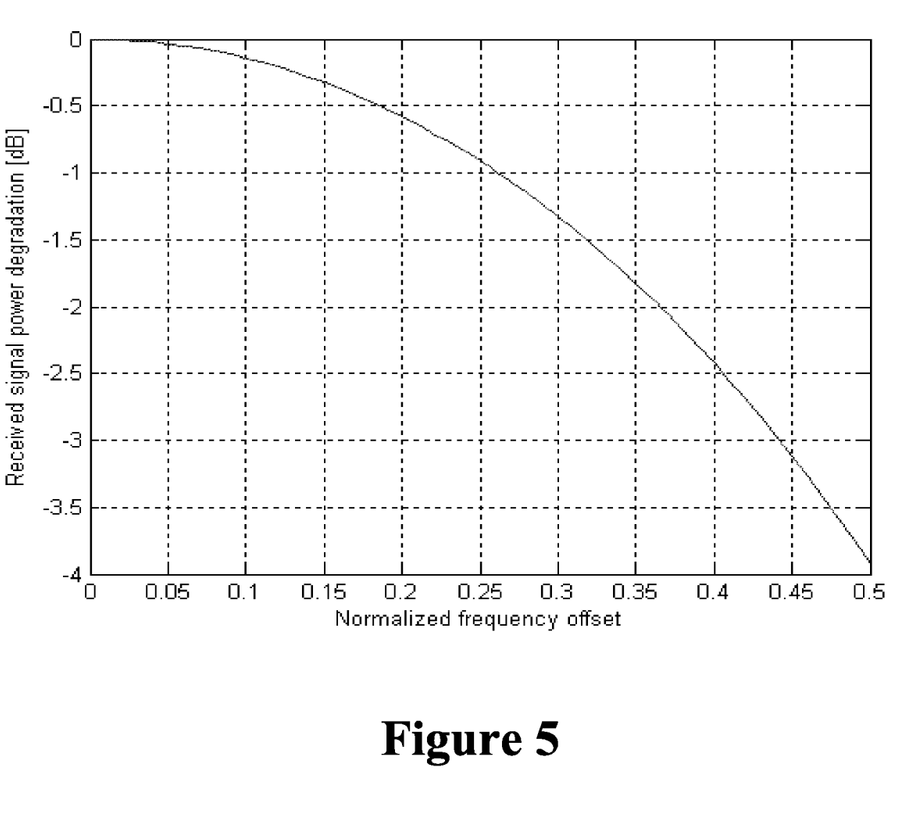
FIG. 5 shows the degradation in received SINR due to frequency offset.

FIG. 5 shows the degradation in received signal power due to frequency offset. The vertical axis indicates the received signal power degradation in decibels and the horizontal axis indicates the normalized frequency offset. In the illustrated embodiment, ICI is assumed to be produced by a single interfering user. The symbol SNR of the user of interest and the symbol SNR of the interfering user are assumed to be equal. Increasing the normalized frequency offset causes the received signal-to-interference-plus-noise ratio (SINR) to be increasingly degraded. FIG. 5 shows that the SINR can degrade up to 4 dB when the frequency offset is large.

Figure 6:
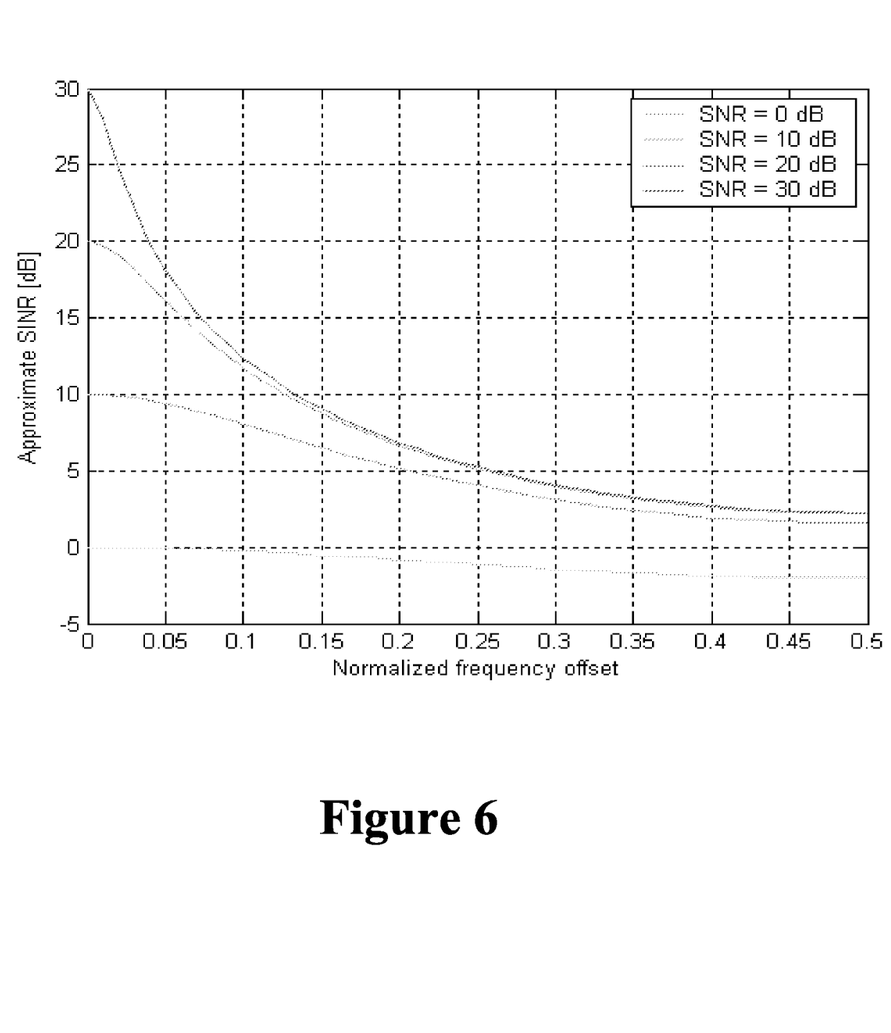
FIG. 6 shows the degradation in the signal-to-interference-plus-noise ratio (SINR) caused by inter-carrier interference (ICI) between users having a normalized frequency offset.

FIG. 6 shows the degradation in the signal-to-interference-plus-noise ratio (SINR) caused by ICI between users having a normalized frequency offset. The vertical axis indicates the approximate SINR and the horizontal axis indicates the normalized frequency offset. FIG. 6 shows that even in the presence of small residual frequency offset, the amount of SINR degradation can be significant. The degradation of the SINR is larger when the SNR is large. Although the symbol constellation of the user of interest may be rotated to approximately the original constellation, conventional frequency offset estimation and compensation algorithms are not typically able to compensate for frequency offset of the interfering user. Consequently, ICI from the frequency offset signal from the interfering user may result in significant degradation in the SINR for the user of interest. This can be a limiting factor in achieving a high target data rate on the uplink in high date rate systems such as the Long Term Evolution (LTE) system.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, methods are provided for wireless communication over a communication link including at least one carrier that comprises a plurality of sub-carriers. One embodiment of the method includes modifying at least one frequency of at least one uplink sub-carrier in response to a signal indicating a modification of the frequency. Another embodiment of the method includes providing a signal indicating a modification of at least one frequency of at least one uplink sub-carrier.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 7:
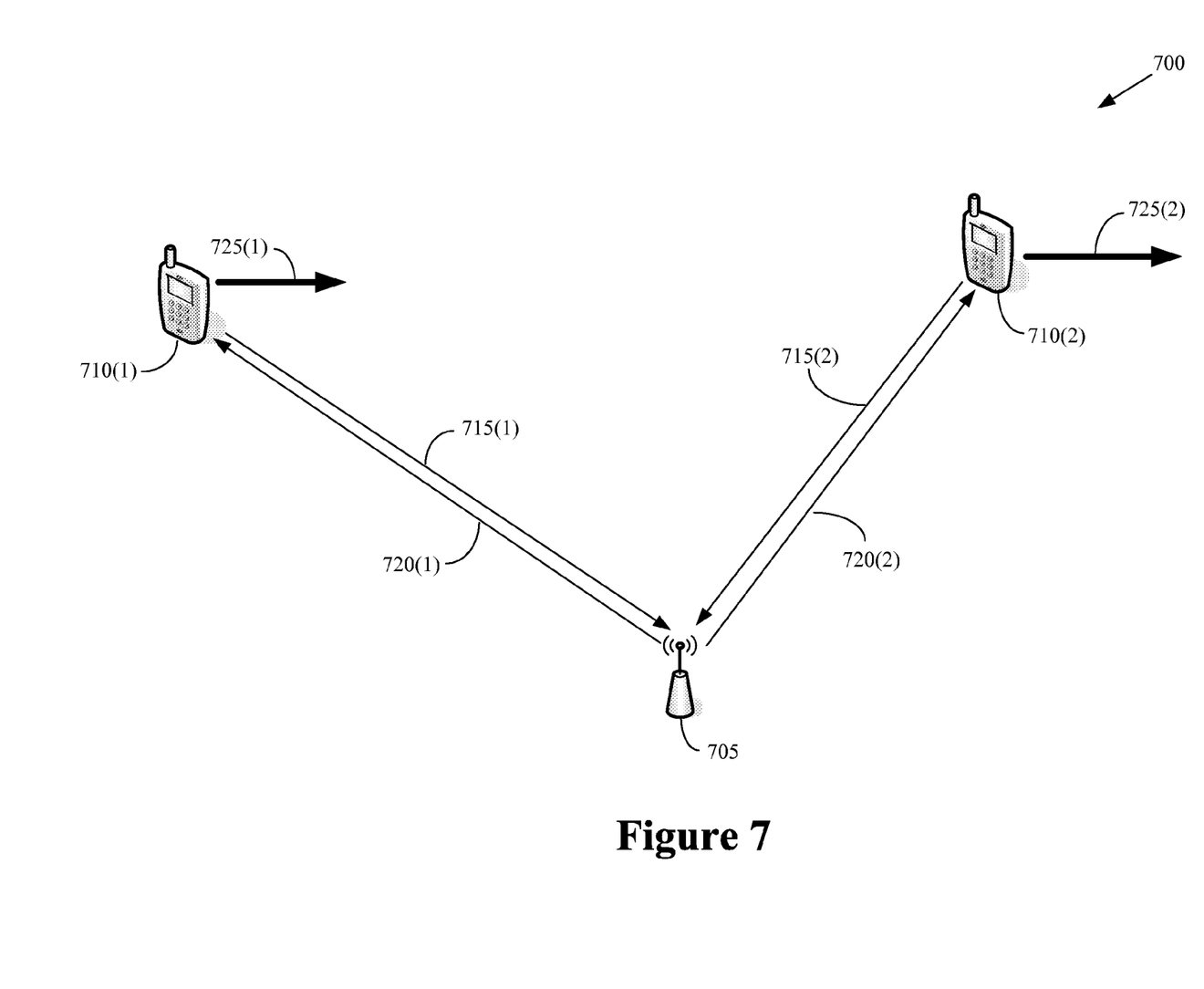
FIG. 7 conceptually illustrates one exemplary embodiment of a wireless communication system, in accordance with one embodiment of the present invention.

Referring now to FIG. 7, one exemplary embodiment of a wireless communication system 700 is illustrated. In the illustrated embodiment, the wireless communication system 700 includes a base station 705. Although a single base station 705 is depicted in the illustrated embodiment, the present invention is not limited to one base station 705 for providing wireless connectivity. In alternative embodiments, the wireless communication system 700 may include any number of the base stations 705 and/or other devices for providing wireless connectivity, such as access points, base station routers, nodes-B, e-nodes-B, and the like. The wireless communication system 700 operates according to Single Channel-FDMA (SC-FDMA). However, the present invention is not limited to systems that operate exclusively according to SC-FDMA. For example, alternative embodiments of the wireless communication system 700 may operate according to Orthogonal Frequency Division Multiple Access (OFDMA) and/or other wireless indication protocols or standards.

The wireless communication system 700 also includes two mobile units 710(1-2). The distinguishing indices (1-2) may be used to indicate individual mobile units 710(1-2) four subsets thereof. However, the indices may be dropped when the mobile units 710 are referred to collectively. This convention may also be applied to other elements shown in the drawings and indicated by reference numerals and one or more distinguishing indices. The mobile units 710(1-2) communicate with the base station 705 over wireless communication links (also known as air interfaces) that include an uplink (or reverse link) 715 and a downlink (or forward link) 720. A band of carrier frequencies is allocated to the wireless communication link and the available frequency spectrum is then divided into a plurality of sub-carriers within the carrier frequency bandwidth. For example, in SC-FDMA, the available bandwidth is divided into a plurality of orthogonal sub-carriers similar to OFDMA, and discrete Fourier transform (DFT) pre-coding is used to provide low Peak-to-Average-Power Ratio (PAPR) compared with OFDMA transmission. Each sub-carrier has a selected frequency and the frequencies associated with different sub-carriers are selected to be orthogonal to each other. Information may then be transmitted between a base station 705 and the mobile unit 710 concurrently over one or more channels of the uplink 715 and downlink 720 that are formed using the sub-carriers.

Frequency offsets may exist between the mobile unit 710 and a base station 705. For example, the sub-carrier frequency transmitted by the mobile unit 710, e.g., over the uplink 715, may differ from a sub-carrier frequency received at the base station 705. Similarly, the sub carrier frequency transmitted by the base station 705, e.g., over the downlink 720, may differ from a sub carrier frequency received at the mobile unit 710. Frequency drifts and/or errors within the transmitting or receiving elements (not shown) of the mobile unit 710 and/or the base stations 705 may also contribute to the frequency offsets. For example, the frequency offset $f_{offset}$ for a subcarrier transmitted between the mobile unit 710 and the base station 705 may be expressed as:

$$f_{offset} = \Delta f_{BS} + \Delta f_{UE} + 2 \times f_{Doppler\_max} \quad \text{(Eq. 3)}$$

where $\Delta f_{BS}$, $\Delta f_{UE}$, and $f_{Doppler\_max}$ denote the base station frequency drift, the mobile unit (or user equipment, UE) frequency error, and the maximum Doppler frequency, respectively.

In the illustrated embodiment, the mobile unit 710(1) is moving approximately towards the base station 705, as indicated by the velocity vector 725(1). Thus, the Doppler shift of the sub-carrier increases the frequency of the sub-carrier relative to the transmitted frequency of the sub-carrier. In the illustrated embodiment, the mobile unit 710(2) is moving approximately away from the base station 705, as indicated by the velocity vector 725(2). Thus, the Doppler shift of the sub-carrier decreases the frequency of the sub-carrier relative to the transmitted frequency of the sub-carrier.

Figure 8A:
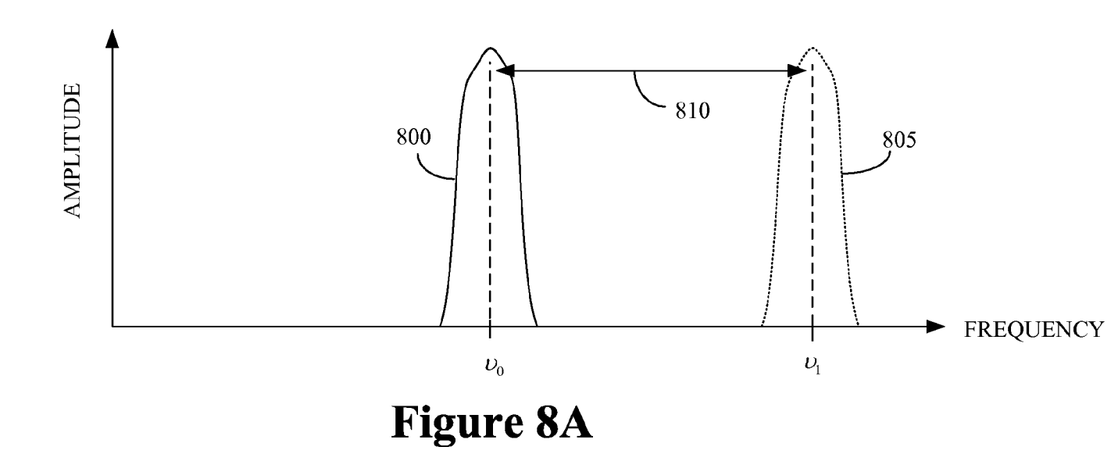
FIGS. 8A and 8B conceptually illustrate received carrier signal frequencies, in accordance with one embodiment of the present invention.
Figure 8B:
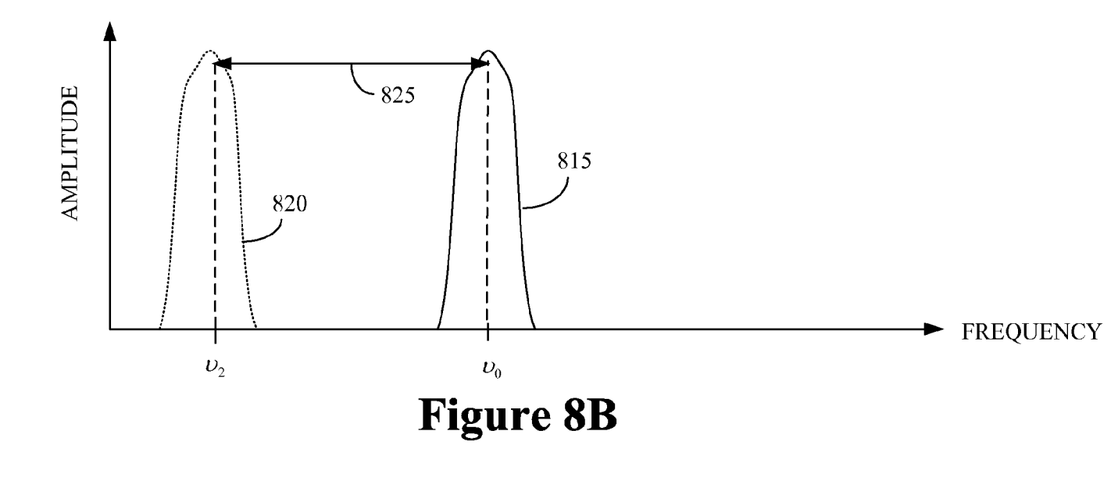

FIG. 8A conceptually illustrates the transmitted frequency 800 of the sub-carrier and the received frequency 805. The vertical axis indicates the amplitude of the received signal (in arbitrary units) and the horizontal axis indicates the frequency of the sub-carrier. In the embodiment shown in FIG. 8A, the transmitting and receiving elements are moving towards each other. The Doppler shift and any other frequency offsets result in the received frequency 805 being larger than the transmitted frequency 800 by a frequency error 810. FIG. 8B conceptually illustrates the transmitted frequency 815 of the sub-carrier and the received frequency 820. The vertical axis indicates the amplitude of the received signal (in arbitrary units) and the horizontal axis indicates the frequency of the sub-carrier. In the embodiment shown in FIG. 8A, the transmitting and receiving elements are moving away from each other. The Doppler shift and any other frequency offsets result in the received frequency 820 being smaller than the transmitted frequency 815 by a frequency error 825.

Referring back to FIG. 7, the frequency of one or more sub-carriers may be modified to compensate for associated frequency offsets. In one embodiment, the base station 705 may monitor a channel, such as a random access channel, for signals such as pilot signals transmitted by the mobile units 710. When the base station 705 receives a pilot signal over the random access channel, the base station 705 may determine a frequency offset or error by comparing the received frequency to an expected frequency of the pilot signal. The base station 705 may then determine an appropriate correction that approximately compensates for the measured frequency offset or error and may transmit information indicating this correction to the mobile unit 710 that transmitted the received pilot signal over the random access channel. The mobile unit 710 may then use this correction signal to modify the frequency of one or more sub-carriers used to transmit information over the uplink 715. In one embodiment, the station 705 may determine modifications to the sub-carrier frequency periodically or in response to the measured frequency offset or error exceeding a threshold value.

Figure 9:
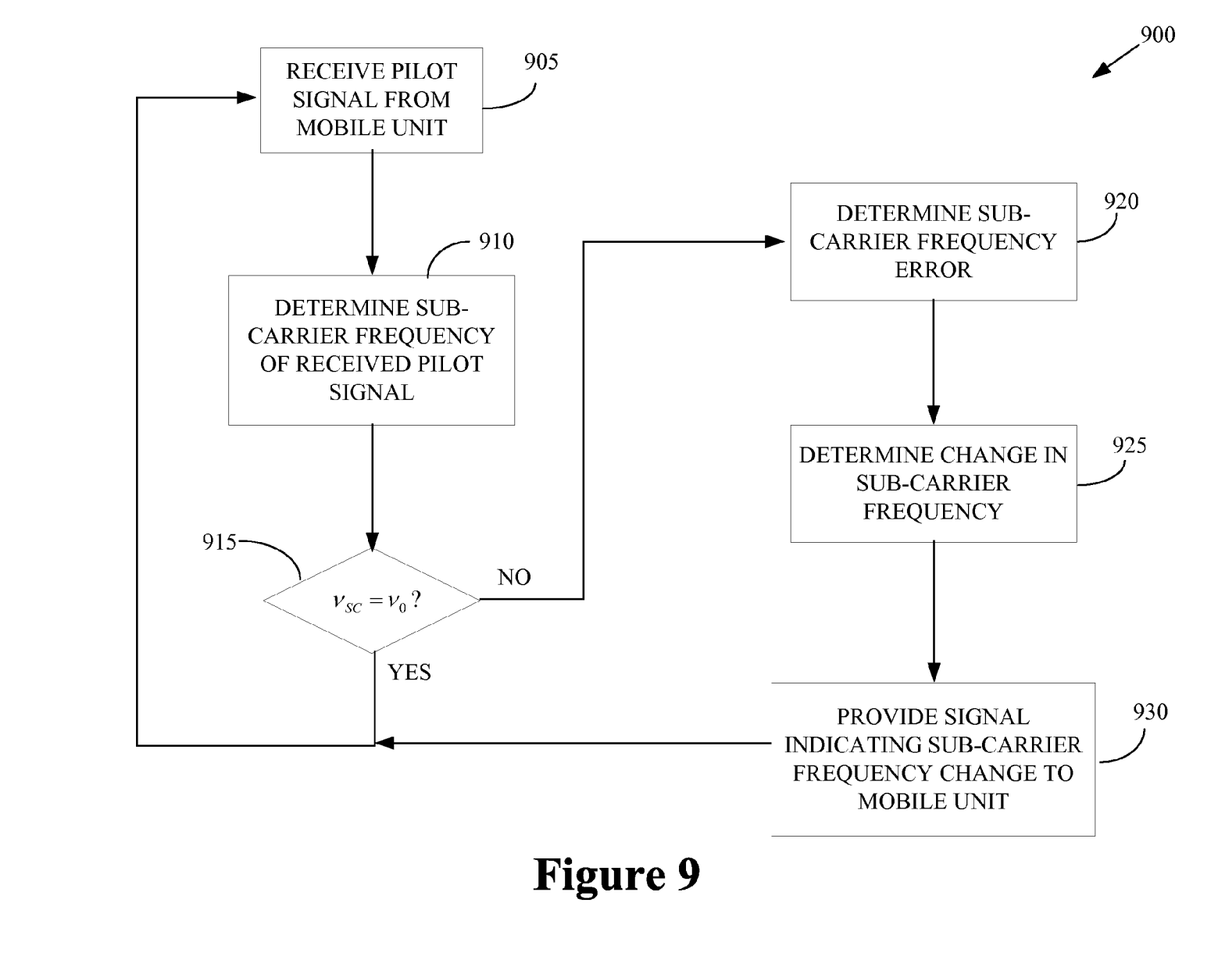
FIG. 9 conceptually illustrates one exemplary embodiment of a method of frequency synchronization, in accordance with one embodiment of the present invention.

FIG. 9 conceptually illustrates one exemplary embodiment of a method 900 of frequency synchronization. In the illustrated embodiment, a base station receives (at 905) a pilot signal from a mobile unit. For example, the base station may be monitoring a random access channel and may receive (at 905) a pilot signal transmitted by the mobile unit over the random access channel. In one embodiment, the received pilot signal may include one or more reference symbols, such as the reference symbols that may be used for channel estimation. For example, the received signal may be a channel sounding reference signal, which may be used for timing and/or frequency estimation, at least in part because the channel sounding reference signal has a large bandwidth and has better timing resolution relative to other reference signals, such as a data demodulation reference signal. The channel sounding reference signal and the data demodulation reference signal are both defined by LTE. Alternatively, the received signal may include a cyclic prefix, such as the cyclic prefix that may be attached to orthogonal frequency division multiplexed (OFDM) signals to reduce or avoid inter-symbol interference. However, persons of ordinary skill in the art having benefit of the present disclosure should appreciate that the present invention is not limited to signals that include these particular symbols and/or prefixes.

The base station may then determine (at 910) the frequency ($v_{SC}$) of the subcarrier used to transmit the pilot signal. As discussed herein, the received frequency ($v_{SC}$) may not correspond to the frequency ($v_0$) used or expected by the receiver in the base station. The base station may therefore determine (at 915) whether the received frequency ($v_{SC}$) is equal to the frequency ($v_0$) expected at the base station. In one embodiment, the received signal may be down-modulated at the expected subcarrier frequency ($v_{SC}$) and then the autocorrelation properties may be used to estimate the frequency offset in the equivalent complex baseband representation of the received and down-modulated signal. For example, the auto-correlation properties of reference symbols corresponding to the received pilot signal may be used to estimate the frequency offset. For another example, the autocorrelation properties of the cyclic prefix included in the received signal may be used to estimate the frequency offset. In one embodiment, the base station may determine (at 915) whether the received frequency ($v_{SC}$) is within a selected tolerance of the frequency ($v_0$). For example, if the received frequency ($v_{SC}$) is within the selected tolerance of the frequency ($v_0$), then the receiver may determine that the received frequency ($v_{SC}$) is substantially equal to the frequency ($v_0$). However, if the received frequency ($v_{SC}$) is not within the selected tolerance of the frequency ($v_0$), then the receiver may determine that the received frequency ($v_{SC}$) is not substantially equal to the frequency ($v_0$).

If the base station determines (at 915) that the received frequency ($v_{SC}$) is substantially equal to the frequency ($v_0$), then the base station may wait for additional signals from the mobile unit. For example, the base station may monitor a random access channel or other channels or sub-channels for signals that may be used to determine (at 910) sub-carrier frequencies associated with mobile units in communication with the base station. If the base station determines (at 915) that the received frequency ($v_{SC}$) is not substantially equal to the frequency ($v_0$), then the base station may determine (at 920) a sub-carrier frequency error. For example, the sub-carrier frequency error may be defined as the difference between the received frequency ($v_{SC}$) and the expected frequency ($v_0$).

A change in the sub-carrier frequency may then be determined (at 925) using the sub-carrier frequency error. In one embodiment, the received frequency ($v_{SC}$) and the expected frequency ($v_0$) may also be used to determine (at 925) the change in the sub-carrier frequency. For example, the change in the sub-carrier frequency may be determined (at 925) to be approximately equal to the difference between the received frequency ($v_{SC}$) and the expected frequency ($v_0$). In one embodiment, the estimated frequency offset can be quantized, e.g., into quantized steps that are a selected fraction of the received frequency ($v_{SC}$). The quantized value may be used to signal a quantized frequency offset to the mobile station, which then compensates for the corresponding quantized frequency offset. In this embodiment, the residual frequency offset (residual error) after frequency compensation may be limited to a value that is less than the quantization stepsize.

The base station may then provide (at 930) a signal to the mobile unit indicating a modified sub-carrier frequency. In one embodiment, the signal may be a Frequency Advance signal that includes information indicating the value of the sub-carrier frequency that should be used by the mobile unit. Alternatively, the Frequency Advance signal may include information indicating a change in the sub-carrier frequency that should be used by the mobile unit to modify the subcarriers. The change may be indicated as a frequency shift, a percentage change in the frequency, a frequency step (in the case when the possible subcarrier frequencies are predetermined and known to the mobile unit), and the like. The mobile unit may utilize the signal from the base station to modify one or more sub-carrier frequencies to improve frequency synchronization between the mobile unit and the base station. For example, the Frequency Advance signal may be transmitted to the mobile station on a random access channel with a Timing Advance signal prior to initialization of dedicated communication channels between the mobile unit and the base station.

In the embodiment of the method 900 described above, the pilot signal transmitted on a random access channel is used to estimate frequency errors and/or offsets that are used for frequency synchronization. However, the present invention is not limited to use of the pilot signal. In one embodiment, dedicated communication channels or sub-channels may already be formed between the mobile unit and the base station. Signals transmitted on these communication channels or sub-channels may therefore be used to determine (at 910) the frequency ($v_{SC}$) of the subcarrier used to transmit the signals on these communication channels or sub-channels. A closed-loop frequency synchronization mechanism may therefore be implemented to maintain frequency synchronization during communications between the mobile unit and the base station. For example, the base station may periodically determine (at 910) the frequency ($v_{SC}$) of the subcarrier used to transmit the signals on the established communication channels or sub-channels. The determined frequency ($v_{SC}$) may then be used to synchronize frequencies, as discussed above. For another example, the base station may monitor the frequency ($v_{SC}$) of the subcarrier and may initiate the frequency synchronization procedure described herein in response to the frequency ($\upsilon_{SC}$) of the subcarrier differing from the expected frequency ($\upsilon_0$) by a selected value or fractional value.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method of wireless communication over a communication link that comprises a plurality of sub-carriers, comprising:
   providing, from a mobile unit to a base station, a pilot signal on a random access channel of the communication link, wherein the pilot signal comprises a sounding reference signal comprising at least one reference symbol; and
   modifying, at the mobile unit, at least one frequency of at least one uplink sub-carrier in response to a signal transmitted to the mobile unit by the base station, the signal indicating a modification of said at least one frequency, the modification being determined by the base station based on a value of a frequency of the pilot signal measured at the base station, wherein the modification of said at least one frequency is determined by down-modulating the received frequency at an expected sub-carrier frequency and estimating a frequency offset between the expected subcarrier frequency and said at least one frequency using autocorrelation properties of the at least one reference symbol in an equivalent complex baseband representation of the down-modulated signal.

2. The method of claim 1, wherein providing the pilot signal comprises providing a non-synchronized signal on the random access channel prior to initialization of dedicated communication channels between the mobile unit and the base station.

3. The method of claim 2, wherein modifying said at least one frequency comprises modifying said at least one frequency based upon a signal indicating a modification of said at least one frequency, the modification being determined based upon a measured value of the frequency of the non-synchronized signal provided on at least one of the random access channel and the dedicated channel.

4. The method of claim 1, wherein modifying said at least one frequency comprises changing said at least one frequency of said at least one uplink sub-carrier by a percentage of said at least one frequency, the percentage being determined by a difference between the measured value of the frequency of the pilot signal and an expected value of the frequency of the pilot signal.

5. The method of claim 4, wherein changing said at least one frequency by the percentage of said at least one frequency comprises changing said at least one frequency by a percentage of said at least one frequency that is within a selected range of frequency offsets.

6. The method of claim 4, wherein modifying said at least one frequency comprises modifying said at least one frequency at one or more predetermined intervals or when a frequency error exceeds a predefined value.

7. The method of claim 1, comprising providing at least one uplink signal using said at least one uplink sub-carrier having the modified frequency.

8. The method of claim 1, comprising providing, from the mobile unit to the base station, at least one non-synchronized signal on at least one dedicated channel of the communication link and modifying, at the mobile unit, at least one frequency of at least one uplink sub-carrier in response to a signal transmitted to the mobile unit by the base station, the signal indicating a modification of said at least one frequency, the modification being determined by the base station based on a value of frequency of at least one non-synchronized signal measured at the base station.

9. A method of wireless communication over a communication link that comprises a plurality of sub-carriers, comprising:
   receiving, from a mobile unit at a base station, a pilot signal on a random access channel of the communication link, wherein the pilot signal comprises a sounding reference signal comprising at least one reference symbol;
   measuring, at the base station, a value of a frequency of the pilot signal; and
   providing, from the base station to the mobile unit, a signal indicating a modification of at least one frequency of at least one uplink sub-carrier of the communication link, the modification being determined by the base station based on the measured value of the frequency of the pilot signal and by down-modulating the received frequency at an expected subcarrier frequency and estimating a frequency offset between the expected subcarrier frequency and said at least one frequency using autocorrelation properties of the at least one reference symbol in an equivalent complex baseband representation of the down-modulated signal.

10. The method of claim 9, wherein receiving the pilot signal comprises receiving a non-synchronized signal on the random access channel prior to initialization of dedicated communication channels between the mobile unit and the base station.

11. The method of claim 9, wherein determining the modification of said at least one frequency comprises determining a frequency error indicating a difference between a measured value of a frequency of the non-synchronized signal and an expected value of the frequency of the non-synchronized signal.

12. The method of claim 11, wherein determining the modification of said at least one frequency comprises determining a modification of said at least one frequency that corresponds to a percentage of said at least one frequency, the percentage being determined by a difference between the measured value of the frequency of the pilot signal and an expected value of the frequency of the pilot signal.

13. The method of claim 12, wherein determining the modification of said at least one frequency comprises determining a modification of said at least one frequency that corresponds to a percentage of said at least one frequency, the percentage being within a selected range of frequency offsets.

14. The method of claim 9, comprising receiving at least one uplink signal transmitted by the mobile unit using said at least one uplink sub-carrier having the modified frequency.

15. The method of claim 9, comprising determining the modification of said at least one frequency at one or more predetermined intervals or when a frequency error exceeds a predefined value.

16. The method of claim 9, wherein providing the signal indicating the modification of said at least one frequency comprises providing the signal on a random access channel prior to initialization of dedicated communication channels between the mobile unit and the base station.

* * * * *